United States Patent [19]
Cockroft

[11] Patent Number: 6,006,284
[45] Date of Patent: Dec. 21, 1999

[54] METHOD AND APPARATUS FOR DRIVING A PARALLEL PART TO PROVIDE MULTIPLE MODES OF COMMUNICATIONS BETWEEN A HOST AND A PERIPHERAL

[75] Inventor: Charles Jason Cockroft, Sunnyvale, Calif.

[73] Assignee: Sun Microsystems, Inc., Mountain View, Calif.

[21] Appl. No.: 08/828,567

[22] Filed: Mar. 31, 1997

[51] Int. Cl.⁶ .............................. G06F 13/00; G06F 13/14
[52] U.S. Cl. ................................. 710/14; 710/29; 710/31; 710/35; 710/52; 709/301
[58] Field of Search ..................... 395/834, 821, 395/851, 855, 872, 681; 710/14, 1, 31, 35, 32, 52, 301, 29; 371/69.1

[56] References Cited

U.S. PATENT DOCUMENTS

| | | | |
|---|---|---|---|
| 4,953,210 | 8/1990 | McGlynn et al. | 380/48 |
| 5,129,072 | 7/1992 | Larner et al. | 395/425 |
| 5,309,562 | 5/1994 | Li | 395/200 |
| 5,333,299 | 7/1994 | Koval et al. | 395/550 |
| 5,349,693 | 9/1994 | Matsushita | 395/800 |
| 5,390,321 | 2/1995 | Proesel | 395/500 |
| 5,519,833 | 5/1996 | Agranat et al. | 395/200.03 |
| 5,519,853 | 5/1996 | Moran et al. | 395/550 |
| 5,666,558 | 9/1997 | Pipkins | 395/851 |
| 5,737,543 | 4/1998 | Gavin et al. | 395/285 |

*Primary Examiner*—Thomas C. Lee
*Assistant Examiner*—Rehara Perveen
*Attorney, Agent, or Firm*—Blakely Sokoloff Taylor & Zafman

[57] ABSTRACT

A system and method for providing multiple modes of parallel communications between a host and a peripheral. In the system and method, a driver provides support for a plurality of transfer modes while satisfying the streams requirements of a host kernel during both forward and reverse transfers. The driver begins in a known mode and negotiates the host and peripheral into a best mode supported by both the host and the peripheral. The driver satisfies streams requirements, thereby permitting high level handshaking and use of ioctls in UNIX based systems. When data is to be transferred, a message is placed on a queue to be serviced in the order received. The type of the message is indicative of the direction of the desired transfer. Each message is serviced in turn, and the transfer conducted using the most efficient mode available.

20 Claims, 19 Drawing Sheets

```
ecpp_open()
{
    mutex_enter(&pp->umutex);

if ((pp->oflag == TRUE)) {
        PRNopen0("ecpp open failed");
        mutex_exit(&pp->umutex);
        return (EBUSY);
    }
    pp->oflag = TRUE;
    mutex_exit(&pp->umutex);

/* initialize state variables */
    pp->error_status = ECPP_NO_1284_ERR;
    pp->xfer_parms = default_xfer_parms;      /* structure assignment */ pp->current_mode = ECPP_CENTRONICS;
    pp->current_phase = ECPP_PHASE_PO;
    pp->port = ECPP_PORT_DMA;
    pp->instance = instance;
    pp->xfer_parms.write_timeout = ecpp_def_timeout;
    pp->timeout_error = 0;
    pp->saved_dsr = PP_GETB(pp->i_handle, &pp->i_reg->dsr);

/* put SuperIO chip in initial state */
    PP_PUTB(pp->f_handle, &pp->f_reg->ecr,
        (ECR_mode_000 | ECPP_INTR_MASK |
        ECPP_INTR_SRV | ECPP_FIFO_EMPTY));

ecpp_init_interface(pp);
    RESET_DMAC_CSR(pp);
    set_chip_pio(pp);

ecpp_default_negotiation(pp);
    /* check that phases are correct for corresponding mode */
    Figure 3b
    return (0);
}
```

*Figure 3a*

```
/* STREAM setup */
if (!(mop = allocb(sizeof (struct stroptions), BPRI_MED))) {
        return (EAGAIN);
} q->q_ptr = WR(q)->q_ptr = (caddr_t) pp;

mop->b_datap->db_type = M_SETOPTS;
mop->b_wptr += sizeof (struct stroptions);

/*
 * if device is open with O_NONBLOCK flag set, let read(2) return 0
 * if no data waiting to be read.  Writes will block on flow control.
 */
sop = (struct stroptions *) mop->b_rptr;
sop->so_flags = SO_HIWAT | SO_LOWAT | SO_NDELON;
sop->so_hiwat = 512;
sop->so_lowat = 256;

/* enable the stream */
qprocson(q);

putnext(q, mop);

pp->readq = RD(q);
pp->writeq = WR(q);
pp->msg = (mblk_t *)NULL;
```

*Figure 3b*

```
ecpp_default_negotiation()
{
        if (ecpp_mode_negotiation(pp, ECPP_ECP_MODE) == SUCCESS) {
                if (pp->current_mode == ECPP_ECP_MODE) {
                        pp->backchannel = ECPP_ECP_MODE;
                }
        } else if (ecpp_mode_negotiation(pp, ECPP_NIBBLE_MODE) == SUCCESS) {
                if (pp->current_mode == ECPP_NIBBLE_MODE) {
                        pp->backchannel = ECPP_NIBBLE_MODE;
                }
        } else {
                /*
                 * for some reason the 1284 device didn't negotiate
                 * into nibble mode. Almost a fatal error.
                 */
                if (pp->current_mode == ECPP_CENTRONICS) {
                        pp->backchannel = ECPP_CENTRONICS;
                }
        }
}
```

*Figure 4*

```
ecpp_wput()
{
    switch (DB_TYPE(mp)) { case M_DATA:
        while (mp) {
            if ((mp->b_wptr - mp->b_rptr) <= 0) {
                freemsg(mp);
                mp = NULL;
            } else {
                if (canput(q)) {
                    mp1 = unlinkb(mp);
                    mp->b_cont = NULL;
                    (void) putq(q, mp);
                    mp = mp1;
                } else {
                    cmn_err(CE_WARN, "ecpp wput err\n");
                    return (ENOSR);
                }
            }
        } break;
```

*Figure 5*

```
ecpp_wsrv()
{
        starting = 0;
        /*
         * if channel is actively doing work, wait till completed
         */
        if (pp->e_busy == ECPP_BUSY) {
                pp->service = TRUE;
                return (0);
        }
        len = total_len = 0;
        my_dmablock = dmablock;
        while (mp = getq(q)) {
                switch (DB_TYPE(mp)) {
                case M_DATA:
                        ASSERT(pp->e_busy == ECPP_IDLE);
                        len = mp->b_wptr - mp->b_rptr;
                        if (len >= DMABUFSZ) {
                                pp->e_busy = ECPP_BUSY;
                                starting ++;
                                ecpp_start(q, mp, (caddr_t)mp->b_rptr, len);
                                return (1);
                        }
                        if (total_len + len <= DMABUFSZ) {
                                PTRACE(ecpp_wsrv, 'NELW', len);
                                bcopy((void *)mp->b_rptr,
                                    (void *)my_dmablock, len);
                                my_dmablock += len;
                                total_len += len;
                                starting++;
                                freemsg(mp);
                                omp = (mblk_t *)NULL;
                                break;
                        } else {
                                putbq(q, mp);
                                pp->e_busy = ECPP_BUSY;
                                starting++;
                                ecpp_start(q, omp, dmablock, total_len);
                                return (1);
                        }
                        break;
                case M_CTL:
                        ecpp_peripheral2host(pp);
                        break;
```

*Figure 6*

```
ecpp_start()
{
        ASSERT(pp->e_busy == ECPP_BUSY);

/* get DMA resources */
        ...

mutex_enter(&pp->umutex);

/* put dmac in a known state */
        RESET_DMAC_CSR(pp);

switch (pp->current_mode) {
        case ECPP_CENTRONICS:
        case ECPP_COMPAT_MODE:
                /* now put the host interface in the correct mode */
                ecr = PP_GETB(pp->f_handle, &pp->f_reg->ecr);
                ecpp_error(pp->dip, "ecpp_start ecr %x\n", ecr);

PP_PUTB(pp->f_handle, &pp->f_reg->ecr,
                        (ECR_mode_010 | ECPP_DMA_ENABLE));

pp->current_phase = ECPP_PHASE_CMPT_FWD;
                break;
        case ECPP_DIAG_MODE:
                PP_PUTB(pp->f_handle, & pp->f_reg->ecr,
                        (ECPP_DMA_ENABLE | ECPP_INTR_MASK
                        | ECR_mode_110 | ECPP_FIFO_EMPTY));
                break;
        case ECPP_NIBBLE_MODE:
                Figure 7b
                break;
        case ECPP_ECP_MODE:
                Figure 7c
                break;
        }
        /* START DMA by programming DMAC */
        set_dmac_bcr(pp, pp->dma_cookie.dmac_size);
        set_dmac_acr(pp, pp->dma_cookie.dmac_address);

set_dmac_csr(pp, DCSR_INIT_BITS2);      /* read from memory to device
*/
        return (0);
}
```

*Figure 7a*

```
if (pp->current_phase != ECPP_PHASE_NIBT_REVIDLE)
        ecpp_error(pp->dip, "ecpp_start: nibble problem\n");
else
        ecpp_terminate_phase(pp);
/* no put the host interface in the correct mode */
ecr = PP_GETB(pp->f_handle, &pp->f_reg->ecr);
ecpp_error(pp->dip, "ecpp_start ecr %x\n", ecr);
PP_PUTB(pp->f_handle, &pp->f_reg->ecr,
        (ECR_mode_010 | ECPP_DMA_ENABLE));

PP_PUTB(pp->i_handle, &pp->i_reg->dcr,
        ECPP_DCR_SET | ECPP_nINIT | ECPP_SLCTIN);

pp->current_phase = ECPP_PHASE_CMPT_FWD;
```

*Figure 7b*

```
switch (pp->current_phase) { case ECPP_PHASE_ECP_FWD_IDLE:
      break;
case ECPP_PHASE_ECP_REV_IDLE:
      ecp_reverse2forward(pp);
      break;
default:
      ecpp_error(pp->dip, "ecpp_start: ecp problem\n");
      break;
}

PP_PUTB(pp->f_handle, &pp->f_reg->ecr,
      (ECR_mode_011 | ECPP_DMA_ENABLE));
```

*Figure 7c*

```
ecpp_isr()
{
        ic = DDI_INTR_UNCLAIMED;

mutex_enter(&pp->umutex);

restart:
        dcsr = get_dmac_csr(pp);

if (dcsr & DCSR_INT_PEND) {  /* interrupt is for this device */
                Figure 8b
                Figure 8c
                Figure 8d
        } else {
                printf("ecpp_isr: interrupt not for us\n");

mutex_exit(&pp->umutex);

} return (ic);
}
```

*Figure 8a*

```
if (dcsr & DCSR_ERR_PEND) {
    /* we are expecting a data transfer interrupt */
    ASSERT(pp->e_busy == ECPP_BUSY);

/*
     * some kind of DMA error.  Abort transfer and retry.
     * on the third retry failure, give up.
     */ if ((get_dmac_bcr(pp)) != 0) {
        mutex_exit(&pp->umutex);
        ecpp_error(pp->dip,
                "interrupt with bcr != 0");
        mutex_enter(&pp->umutex);
    }

RESET_DMAC_CSR(pp);

ddi_dma_unbind_handle(pp->dma_handle);

if (pp->msg != NULL) {
        freemsg(pp->msg);
        pp->msg = (mblk_t *)NULL;
    } ic = DDI_INTR_CLAIMED;

pp->service = FALSE;
    pp->e_busy = ECPP_IDLE;

pp->about_to_untimeout = 1;
    mutex_exit(&pp->umutex);

untimeout(pp->timeout_id);

mutex_enter(&pp->umutex);
    pp->about_to_untimeout = 0;
    mutex_exit(&pp->umutex);

ecpp_error(pp->dip, "transfer count error");

return (ic);
}
```

*Figure 8b*

```
if (dcsr & DCSR_TC) {

/* we are expecting a data transfer interrupt */
    ASSERT(pp->e_busy == ECPP_BUSY);

/* disable DMA (don't mask other interrupts) */ if (pp->current_mode == ECPP_DIAG_MODE) {
        AND_SET_BYTE_R(pp->f_handle, &pp->f_reg->ecr,
            ~ECPP_DMA_ENABLE);
    } else {
        if (PP_GETB(pp->f_handle,
            &pp->f_reg->ecr) & ECPP_INTR_SRV) {
            OR_SET_BYTE_R(pp->f_handle,
                &pp->f_reg->ecr, (ECPP_INTR_SRV));
        }
    }
    /* ACK and disable the TC interrupt */
    OR_SET_LONG_R(pp->d_handle, &pp->dmac->csr,
        DCSR_TC | DCSR_TCI_DIS);
    /* disable DMA and byte counter */
    AND_SET_LONG_R(pp->d_handle, &pp->dmac->csr,
        ~(DCSR_EN_DMA | DCSR_EN_CNT));
    ASSERT(--pp->dma_cookie_count == 0);
    ddi_dma_unbind_handle(pp->dma_handle);
    pp->service = FALSE;
    qenable(pp->writeq);
    /*
     * We are done if there are no more mblocks
     */
    mp = getq(pp->writeq);
    if (mp == NULL) {
        cv_signal(&pp->pport_cv);
    } else {
        putbq(pp->writeq, mp);
    }
    pp->e_busy = ECPP_IDLE;
    ic = DDI_INTR_CLAIMED;
    return (ic);
}
dsr = PP_GETB(pp->i_handle, &pp->i_reg->dsr);
/* does peripheral need attention? */
```

*Figure 8c*

```
if ((dsr & ECPP_nERR) == 0) {
    drv_usecwait(20);  /* 20us */
    /*
     * mask the interrupt so that it can be
     * handled later.
     */
    OR_SET_BYTE_R(pp->f_handle,
        &pp->f_reg->ecr, ECPP_INTR_MASK);

/*
     * dma breaks in ecp mode if the next three lines
     * are not there.
     */
    drv_usecwait(6);  /* 6us */ if (pp->current_mode == ECPP_ECP_MODE) {
        PP_PUTB(pp->f_handle, &pp->f_reg->ecr,
            (ECPP_INTR_MASK | ECR_mode_011 |
            ECPP_DMA_ENABLE));
    } else {
        PP_PUTB(pp->f_handle, &pp->f_reg->ecr,
            (ECPP_INTR_MASK | ECR_mode_001 |
            ECPP_DMA_ENABLE));
    }
    set_dmac_csr(pp, DCSR_INIT_BITS2);
    mutex_exit(&pp->umutex);
    mp = allocb(sizeof (int), BPRI_MED);
    if (mp == NULL) {
        ecpp_error(pp->dip,
            "lost backchannel\n");
    } else {
        mp->b_datap->db_type = M_CTL;
        *(int *)mp->b_rptr = ECPP_BACKCHANNEL;
        mp->b_wptr = mp->b_rptr + sizeof (int);
        if ((pp->oflag == TRUE)) {
            putbq(pp->writeq, mp);
            qenable(pp->writeq);
        }
    }
    ic = DDI_INTR_CLAIMED;
    return (ic);
}
```

*Figure 8d*

```
static uint_t
ecpp_peripheral2host()

{
        if (pp->current_mode == ECPP_DIAG_MODE)
                return (SUCCESS);

switch (pp->backchannel) {
        case ECPP_CENTRONICS:
                return (SUCCESS);
        case ECPP_NIBBLE_MODE:
            Figure 9b
            break;
        case ECPP_ECP_MODE:
            Figure 9c
        default:
                ecpp_error(pp->dip, "ecpp_peripheraltohost: illegal back");
                return (FAILURE);
        }
        return (SUCCESS);
}
```

*Figure 9a*

```
if (pp->current_mode == ECPP_NIBBLE_MODE)
        return (SUCCESS);
else {
        if (pp->current_mode != ECPP_COMPAT_MODE)
                return (FAILURE);

ecpp_mode_negotiation(pp, ECPP_NIBBLE_MODE);
}

/*
 * Event 14: Host tristates data bus, peripheral asserts nERR
 * if data available, usually the status bits (7-0) and requires
 * two reads since only nibbles are transfered.
 */
dsr = PP_GETB(pp->i_handle, &pp->i_reg->dsr);
while ((dsr & ECPP_nERR) == 0) {
        byte = nibble_peripheral2host(pp);
        if ((mp = allocb(sizeof (u_char), BPRI_MED)) == NULL) {
                ecpp_error(pp->dip,
                        "ecpp_periph2host: allocb FAILURE.\n");
                return (FAILURE);
        } if (canputnext(pp->readq) == 1) {
                mp->b_datap->db_type = M_DATA;
                *(u_char *)mp->b_rptr = byte;
                mp->b_wptr = mp->b_rptr + sizeof (u_char);
                putnext(pp->readq, mp);
        }
        dsr = PP_GETB(pp->i_handle, &pp->i_reg->dsr);
}
```

*Figure 9b*

```
switch (pp->current_phase) {
case ECPP_PHASE_ECP_REV_IDLE:
      break;
case ECPP_PHASE_ECP_FWD_IDLE:
      if (ecp_forward2reverse(pp) == SUCCESS)
            break;
      else
            return (FAILURE);
default:
      ecpp_error(pp->dip, "ecpp_periph2host: ECP phase");
      break;
} return (ecp_peripheral2host(pp));
```

*Figure 9c*

METHOD AND APPARATUS FOR DRIVING A PARALLEL PART TO PROVIDE MULTIPLE MODES OF COMMUNICATIONS BETWEEN A HOST AND A PERIPHERAL

BACKGROUND OF THE INVENTION (1) Field of the Invention

The invention relates to parallel port device drivers. More specifically, the invention relates to the device driver which can be used to implement the IEEE 1284 bi-directional parallel peripheral interface standard.

(2) Related Art

Parallel port communications have been generally well-known for some time. Throughout the 1980's, a unidirectional parallel communication between hosts and printers or hosts and other peripheral devices was commonly used. This unidirectional mode of communication became known as Centronics® communications after the company which first introduced it, Centronics Data Computer Corporation. Centronics® is an 8 bit parallel unidirectional communication link between the host and a peripheral with data only flowing in a forward direction, i.e. from the host to the peripheral. Centronics® was so widely used, it became a de facto standard in the industry. Unfortunately, Centronics® suffers from one major shortcoming which limits its utility in a network environment, specifically, it is unidirectional It is also relatively slow.

Accordingly, as networks have become more prevalent, there has been a push in the industry to develop a standard method for bi-directional parallel communications between hosts and peripheral devices. In response to this push, IEEE has promulgated a standard signaling method for a bi-directional parallel peripheral interface for personal computers, IEEE 1284 specification ("1284"). The 1284 defines a signaling method for bi-directional parallel communications between hosts and peripheral devices. It is also asynchronous and fully interlocked. By virtue of the fact that there were a number of divergent interests in the working group preparing the standard, the standard defines five distinct modes of operation. Specifically, compatibility mode, nibble mode, byte mode, enhanced parallel port mode (EPP mode) and extended capabilities port mode (ECP mode) are all defined under the umbrella of a "single" standard.

Compatibility mode is basically the former Centronics® mode, which provides an asynchronous byte-wide forward (host to peripheral) channel with data and status lines used according to the prior definitions. Compatibility mode has the effect of making 1284 backward compatible.

Nibble mode is a peripheral to host unidirectional protocol which can be used in conjunction with compatibility mode for a full bi-directional interface. Data is transferred to the host four bits at a time over four control signals defined in the Centronics® parallel port. The nibble protocol employs a program input/output (PIO) interface to work with existing parallel port controllers. The data transfer rate is quite slow.

Byte mode is a peripheral to host unidirectional protocol which can be used in conjunction with compatibility mode for a full bi-directional interface. Bytes are transferred to the host over the eight data lines. Byte mode is twice as fast as nibble mode, but is still a PIO interface and, consequently, relatively slow. Moreover, the byte mode protocol required an expanded definition of the data lines from the existing Centronics® standard.

Expanded parallel port mode defines a bi-directional protocol in which bytes are transferred in either direction by an interrupt driven PIO interface. Either the host or the peripheral may fill a 4 byte buffer and await a signal to indicate the transfer was completed. While this mode is faster than byte or nibble mode, it is still an interrupt driven PIO which is relatively slow and has not gained wide acceptance.

Extended compatibility port mode is a high speed bi-directional protocol in which bytes are transferred in either direction by a DMA driven interface. This mode is the fastest and most efficient of the IEEE 1284 modes.

While the electrical signaling and cabling requirements for each mode are well-defined in the IEEE 1284 specification, and chip manufacturers have provided the hardware necessary to implement these various modes, the issue of 1284 device drivers has been largely ignored. Significantly, each mode defines a separate and distinct protocol with different signaling and phase requirements which would arguably justify implementing each protocol as a separate driver. However, because any single device must have only a single driver, the 1284 specification creates a unique problem of requiring the implementation of multiple distinct protocols within the single driver. This is particularly true given that the specification requires that to be 1284 compliant, a device must support at least compatibility mode and nibble mode.

A portion of the host kernel is the streams environment. The streams environment has many special requirements which are detailed in full in the Streams Programmer's Guide Sun OS 5.3 (1993). Particularly in the context of a 1284 device driver, a streams interface allows handshaking with upper level modules to provide effective coordination of data transfers. Additionally, the streams environment provides required support for ioctls making such ioctls available for use with the driver.

Therefore, it would be desirable to develop a device driver which is 1284 compliant and readily interfaces with the streams environment.

BRIEF SUMMARY OF THE INVENTION

A system and method for providing multiple modes of parallel communications between a host and a peripheral is disclosed. In the system and method, a driver provides support for a plurality of transfer modes while satisfying the steams requirements of a host kernel during both forward and reverse transfers. The driver begins in a known mode and negotiates the host and peripheral into a best mode supported by both the host and the peripheral. The driver satisfies streams requirements, thereby permitting high level handshaking and use of ioctls in UNIX based systems. When data is to be transferred, a message is placed on a queue to be serviced in the order received. The type of the message is indicative of the direction of the desired transfer. Each message is serviced in turn, and the transfer conducted using the most efficient mode available.

BRIEF DESCRIPTION OF THE DRAWINGS

FIG. 3a is a code diagram of an entry point for the driver of one embodiment of the invention.

FIG. 3b is a code diagram of the streams setup routine in the entry point of FIG. 3a.

FIG. 4 is a code diagram of a negotiation routine for the driver of one embodiment of the invention.

FIG. 5 is a code diagram of a write-side entry point for the driver of one embodiment of the invention.

FIG. 6 is a code diagram of a write-side service routine for the driver of one embodiment of the invention.

FIGS. 7a–c are code diagrams of a DMA transfer initiation routine for the driver of one embodiment of the invention.

FIGS. 8a–d are code diagrams of interrupt investigation and service routine of the driver of one embodiment of the invention.

FIGS. 9a–c are code diagrams of a backchannel transfer routine for the driver of one embodiment of the invention.

DETAILED DESCRIPTION OF THE INVENTION

A method and system for providing multiple modes of parallel communications between a host and a peripheral device is disclosed. In one embodiment, the system is 1284 compliant. In the following description, for the purposes of explanation, specific applications, numbers, and configurations are set forth in order to supply a full understanding of the present invention. However, it would be apparent to one skilled in the art that the present invention may be practiced without the specific details. In other instances, well-known systems are shown in diagrammatical or block diagram form in order not to obscure the present invention unnecessarily.

Figure 1:
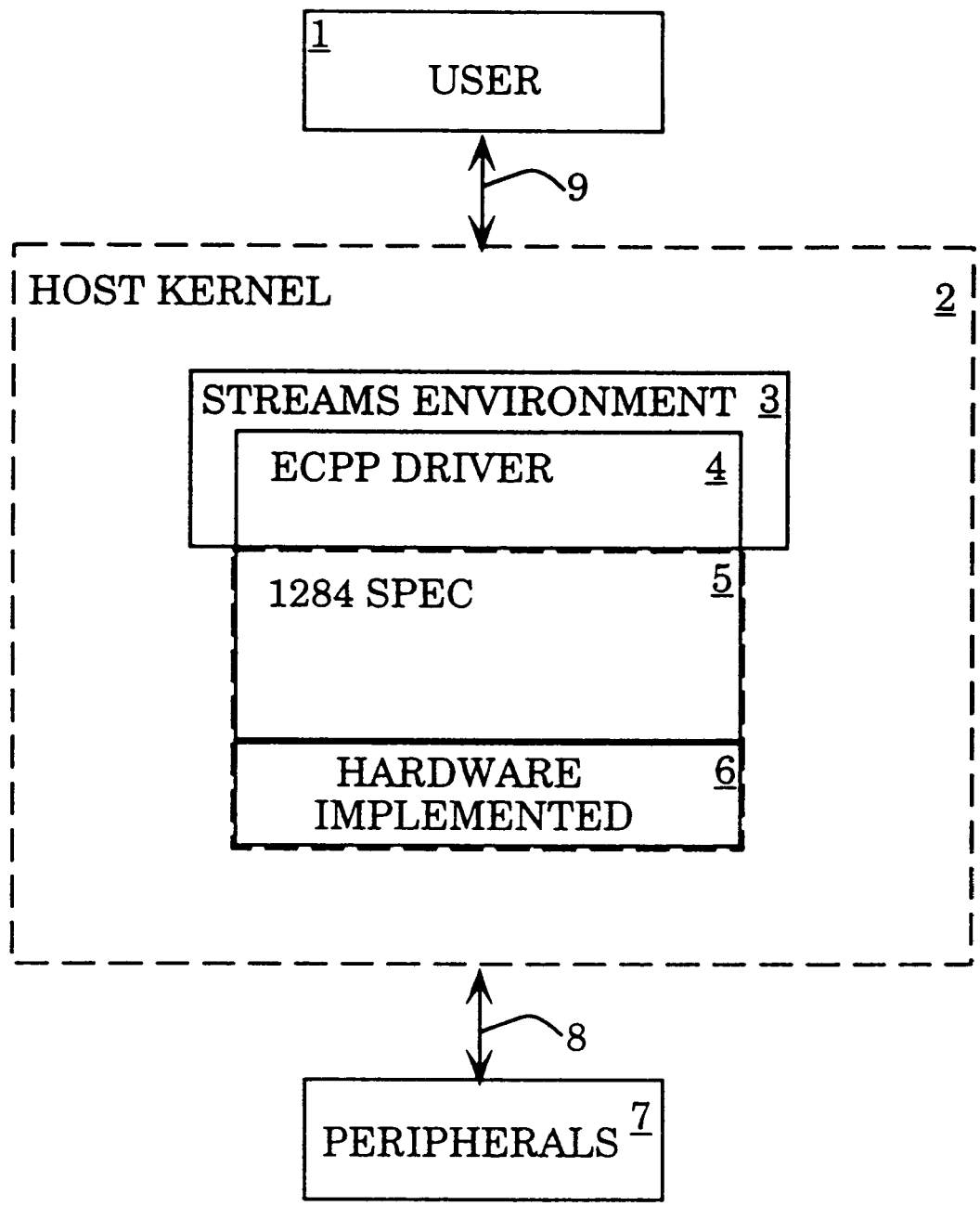
FIG. 1 is a block diagram of a system using one embodiment of the invention.

FIG. 1 shows a block diagram of a system employing the instant invention. A user 1 communicates with the host kernel 2 by a standard user interface 9. The kernel 2 supports the streams environment 3. The 1284 specification 5 is implemented partially by hardware 6 and partially by the ecpp driver 4 of the invention. The ecpp driver also interfaces with the streams environment 3 to achieve the streams compatible 1284 compliant device driver. The portion of the 1284 specification 5 implemented by hardware 6 is dictated by the 1284 specification and supplied by external vendors. Similarly, cabling 8 which interfaces between the kernel 2 and the peripheral 7, is also dictated by the 1284 specification and is commercially available. Peripheral 7 can be any peripheral, including printers, scanners, etc.

FIGS. 2a–d are flowcharts of the operation of the ecpp driver of the invention. The ecpp driver has four major entry points. User application programs may access two of these: ecpp_open( ) routine and the ecpp_wput( ) routine. In addition to these entry points, the ecpp driver is composed of two other major entry points: ecpp_wrsv( ) and ecpp_isr( ). The ecpp_wrsv( ) routine is responsible for invoking the hardware to actually transfer the data. This routine is invoked by the UNIX kernel. The ecpp_isr( ) routine is an interrupt routine that is invoked by the hardware when it requires special attention.

Figure 2A:
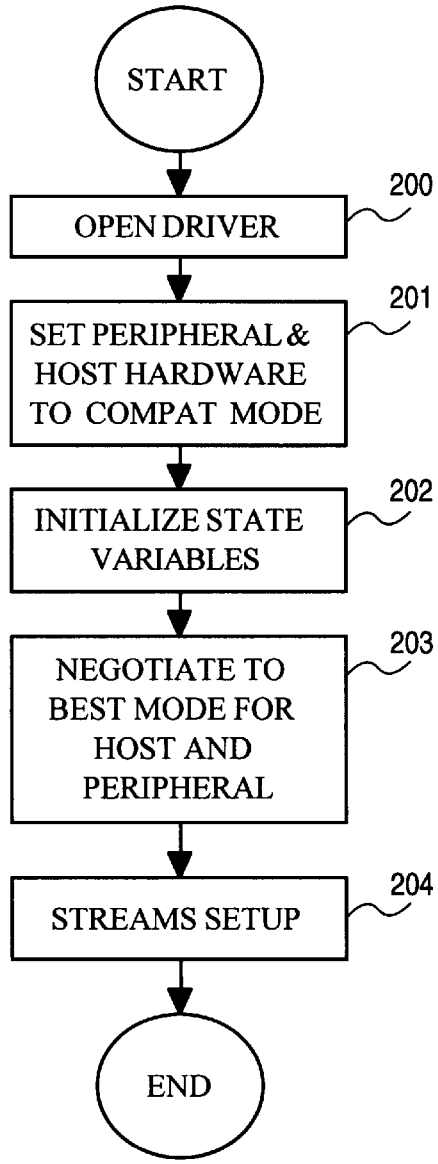
FIGS. 2a–d are flowcharts of operation of the parallel port driver of one embodiment of the invention.

FIG. 2a is a flowchart of the ecpp_open( ) routine. The ecpp_open( ) routine is responsible for initializing the driver and associated hardware. Functional block 200 corresponds to opening the driver through an entry point ecpp_open( ). Functional block 201 corresponds to configuring the host and peripheral into a particular start mode with well-defined characteristics. The start mode in this case is compatibility mode. These functions are all performed by the ecpp_open( ) routine described in detail below.

Once the host and peripheral are set to compatibility mode, the driver sets default values for its state variables at fictional block 202. Afterwards, the driver negotiates the host and peripheral into the best mode supported by both devices at functional block 203. It is anticipated that ECP mode is the best mode and, therefore, the system will first attempt to negotiate into ECP mode. If the system is unable to negotiate into ECP mode, it will then attempt to negotiate into nibble mode. If it fails to negotiate into nibble mode, it will default back into compatability mode. Upon the completion of negotiation at functional block 204, the driver will conduct the necessary structure allocation and structure initialization to conform to the streams structure on the kernel. This enables the put and service routines for reading and writing to or from the read and write queues so that data can be transferred between the host and peripheral from or to the respective queue. Additionally, the put and service routines handle streams requirements corresponding to handshaking with upper level modules and ioctl support. Upon completion, the driver is ready to conduct I/O with the peripheral device. The entry point ecpp_open( ) is terminated.

Figure 2B:
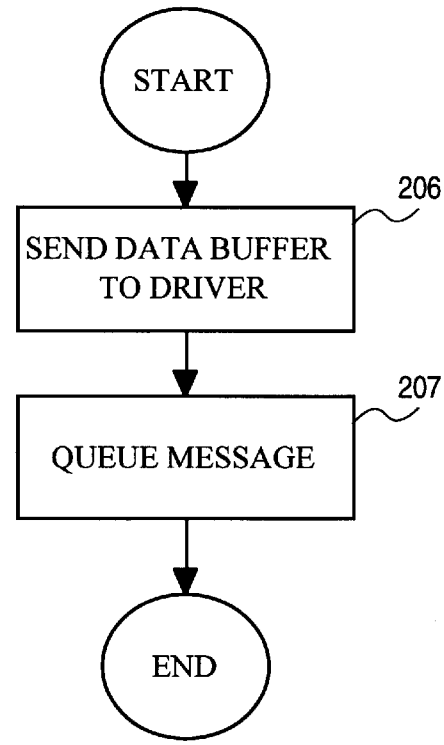

FIG. 2b is a flowchart of the ecpp_wput( ) routine. The ecpp_wput( ) routine is responsible for sending messages that request the kernel and driver to transfer data. If the user application has data to transfer to the peripheral device, or awaits for data to be sent from the peripheral device, the application will send a data buffer to the driver at functional block 206. The driver will queue all requests for later processing at functional block 207. At this point, the write put routine will exit.

Figure 2C:
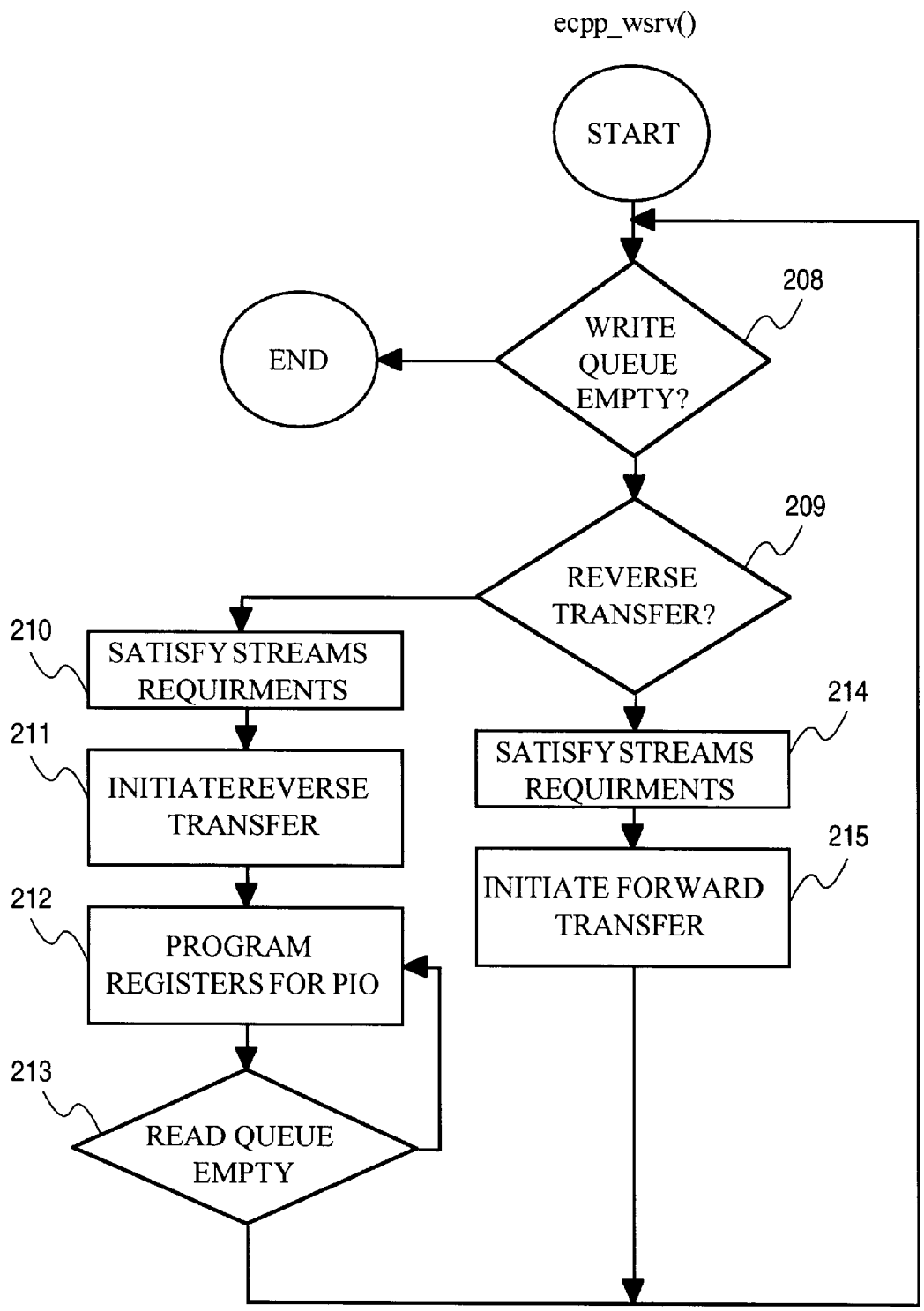

FIG. 2c is a flowchart of the ecpp_wsrv routine. The streams facility in the UNIX kernel will invoke the write service routine ecpp_wsrv( ), when it believes data is in the write queue of the driver. Decision block 205 corresponds to a determination by the write service routine itself, of whether a message is on the write queue. If the write queue is empty, the routine terminates. Otherwise, it continues processing the message. Messages on the write queue correspond to either forward transfers or a request for a reverse transfer. Accordingly, decision block 206 corresponds to determining if the message on the write queue indicates a reverse transfer has been requested. If it does, steams requirements are satisfied in functional block 207, and a reverse transfer is initiated in functional block 208. Registers are programmed for PIO in functional block 209, and the reverse channel data is transferred through a PIO interface. It is determined whether the read queue is empty at decision box 210. If the read queue is not empty, the register stack is again programmed for PIO. If the read queue is empty, the write queue is again checked to determine if additional transfers are waiting, at decision block 205.

If the message on the write queue does not indicate a reverse transfer has been requested, the message is a forward transfer headed for a peripheral. Functional block 213 corresponds to the satisfaction of streams requirements by the ecpp_put( ) and/or ecpp_wsrv( ) routine after which the forward transfer is initiated at functional block 214 by a call to ecpp_start( ). The system proceeds to check the write queue of additional pending messages.

Figure 2D:
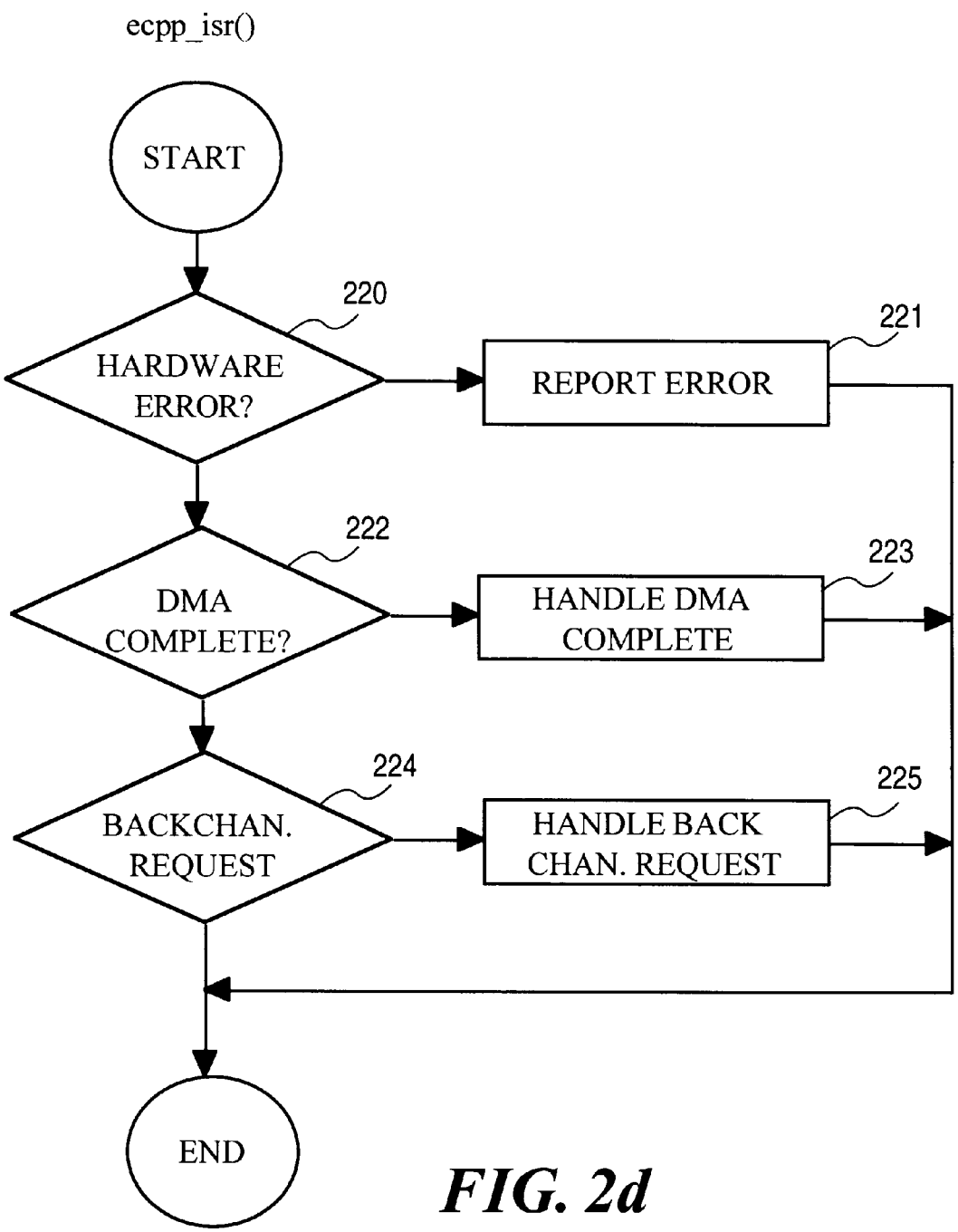

FIG. 2d is a flowchart of the ecpp_isr routine. If the hardware requests attention, the interrupt service routine for the parallel port ecpp_isr( ) will be invoked. In decision block 220, the routine determines if the interrupt was invoked because an error condition occurred. If it did, functional block 221 represents the handling of the error condition. If the interrupt was not caused from an error condition, the routine determines, at decision block 222, if the interrupt was caused because the hardware indicates that the current DMA transfer has completed. If it is, the handling of the DMA completion is represented by functional block 223. If the interrupt was not cause for either of these two reasons, the routine determines at decision block 224 if the interrupt was caused because the peripheral is requesting to send data. The handling of the backchannel request is performed in functional block 225. After the appropriate processing, the interrupt routine exits.

FIG. 3a is a code diagram of an entry point for opening one embodiment of the ecpp device driver of the invention. The ecpp driver is opened using a conventional open driver entry point ecpp_open( ). When the open routine is called, the driver attempts to acquire a device mutex for a peripheral device to or from which a parallel port transfer is desired. If the driver acquires the mutex, and if the driver has not been previously open, the driver marks the open flag as TRUE and then releases the mutex.

After the driver completes this initial step, the routine initializes a set of state variables as shown in FIG. 3a. The state variables include the current_mode, current_phase and port type of the driver. Following this, ecpp_open( ) initializes the parallel port IC registers to its default settings which represents compatibility mode. Afterwards, ecpp_default_negotiation( ) is invoked.

FIG. 4 shows the algorithm for ecpp_default_negotiation( ). The ecpp driver of this embodiment is defined to support ECP mode, nibble mode and compatibility mode. Since ECP mode is the most efficient mode, the driver first attempts to negotiate the host and peripheral into ECP mode. If the negotiation is not successful, an attempt to negotiate into nibble mode is made. If negotiation into nibble mode also fails, the driver defaults into compatibility mode. In this mode, the driver can only transfer data from the host to the peripheral device. The peripheral to host data channel, referred to as the backchannel, is inactive in compatibility mode. Once ecpp_default_negotiation( ) is completed, ecpp_open( ) checks that all parallel port IC registers and corresponding state variables are at the appropriate settings.

FIG. 3b is a code diagram of the initialization of streams structures and values in an embodiment of the ecpp device driver. This initialization is part of the ecpp_open( ) routine of FIG. 3a. Once the driver returns from the default negotiation and the state variable are confirmed correct, ecpp_open( ) initializes the streams structures and values to ensure driver compatibility with the streams environment. Upon completing this task, ecpp_open( ) returns.

FIG. 5 is a code diagram of an entry point, ecpp_wput( ), for write-side data transfers through the driver for one embodiment of the invention. The definition of this routine is essential to comply with the streams requirements of the operating system. All messages posted to this routine are processed according to their type. The most significant type of message block type is M_DATA. This type of message block represents data that is to be transferred to the peripheral device. If an M_DATA message block is received, ecpp_wput( ) checks to see if it can put the message block on a write queue. If it can, it does so and the routine terminates. If it can not, an error is indicated and the routine terminates.

FIG. 6 is a code diagram of a write-side service routine, ecpp_wsrv( ), for the driver of one embodiment of the invention. This routine fulfills the asynchronous write-side streams transfer routine requirements. This routine also processes messages according to the message type. Data of M_DATA type are message blocks that are being transferred from the host to tee peripheral device. M_CTL messages indicate data is being transferred from the peripheral device to the host computer.

The routine ecpp_wsrv( ) collects M_DATA message block data and stores this data in a temporary buffer. It continues to collect data in the temporary buffer until its size reaches the DMABUFSZ. Once this has been achieved, the forward transfer is initiated by the ecpp_start( ) routine. This routine is discussed below in connection with FIGS. 7a–c.

If ecpp_wsrv( ) receives an M_CTL message block, it indicates that the peripheral device has data to send to the host computer. The driver negotiates the driver into the appropriate mode, collects data and formats it into the streams structure through the invocation of the ecpp_peripheral2host( ) routine. The routine ecpp_peripheral2host( ) is discussed below in connection with FIGS. 9a–c.

FIGS. 7a–c is a DMA initiation routine of one embodiment of the invention. The basic task of this routine is to initiate the hardware to conduct a DMA transfer from tee main memory of the host computer to a device FIFO. This task is completed in several steps. As shown in FIG. 7a, initially ecpp_start( ) gains the appropriate DMA structures and values as required by the operating system. Secondly, the routine sets the parallel port IC into the appropriate phase and sets the current_phase state variable. This varies depending on the mode of operation. FIGS. 7b and 7c show the setting of phase and the corresponding state variables for nibble mode and ECP mode, respectively. Finally, the routine programs these DMA structures, the DMA commences, and the routine terminates.

FIGS. 8a–d are code diagrams for interrupt service in one embodiment of the invention. As shown in FIG. 8a, ecpp_isr( ) checks if the device has an interrupt pending flag (DCSR_INT_PEND) in the DMAC control status register (dcsr). If this flag is not set, it indicates that the interrupt was not intended for this device. Consequently, the ecpp_isr( ) terminates. If the flag is set, the routine determines the reason why the interrupt was invoked for this device.

The ecpp_isr( ) routine is invoked if a hardware interrupt is generated by the device. Such an interrupt may be invoked for one of three reasons: (1) An error occurs during a DMA transfer; or (2) a DMA transfer completes (TC); or (3) the peripheral requests the backchannel to be read. Essentially, ecpp_isr( ) has been coded into three major sections to handle these conditions.

In FIG. 8b, ecpp_isr( ) first checks to see if an error occurred during a DMA transfer. If an error occurred, the DCSR_ERR_PEND bit will be set in the DMAC control register. In this case, the control register is reset, and the DMA resources are freed for other use by the operating system. The interrupt routine returns at this point.

If an error condition interrupt has not been generated, ecpp isr( ) checks to see if a transfer complete interrupt has occurred as shown in FIG. 8c. The ecpp_isr( ) routine accomplishes this task by checking the DMAC control register. The DCSR_TC bit will be set in this register if such a condition exists, and the routine disables the DMA mechanism with the DMAC chip. Afterwards, the DMA resources of the operating system are freed, and the routine returns.

The third case is shown in FIG. 8d. If the peripheral device requests the backchannel to be read, the ECPP_nERR bit of the parallel port chip status register (dsr) will be cleared. In such a situation, the ecpp_isr( ) routine masks parallel port interrupts, re-enables DMA transfers, and sets the parallel port IC to the appropriate mode. Finally, in such a situation, ecpp_isr( ) will create a M_CTL message block and pass this message block to the write queue. This message block will be processed at a later time by the ecpp_wsrv( ) routine. After putting this message block on the queue, ecpp_isr( ) will return.

FIGS. 9a–c are code diagrams of a backchannel transfer in one embodiment of the invention showing the algorithm for the ecpp_peripheral2host( ) routine. This routine is responsible for transferring data from the peripheral to the host. Furthermore, this routine transfers the data under the constraints and formatting convention of the streams interface. The method in which the routine retrieves data from the peripheral depends on which backchannel mode the driver is currently set to. The backchannel mode was set in ecpp_default_negotiation( ) as presented in FIG. 4. If backchannel is set to compatibility mode, reverse transfers are not supported. That is, under the compatibility protocol, data may not be transferred from the peripheral back to the host. Consequently, ecpp_peripheral2host( ) immediately returns under such conditions.

FIG. 9b shows the nibble mode case. If the backchannel is set to nibble mode, the driver negotiates the parallel port and the peripheral device into nibble mode. Afterwards, ecpp_peripheral2host( ) invokes nibble_peripheral2host( ) which directly programs the parallel port registers to conduct the 1284 events that will lead the peripheral device to transfer a byte to the host. Once this byte has been retrieved, ecpp_peripheral2host( ) will allocate a message block and transfer the retrieved byte to this block. Afterwards, this message block is put onto the read-queue for upstream processing.

FIG. 9c shows the ECP mode case. If the backchannel is set to ECP mode, the driver will negotiate the parallel port and peripheral device into reverse ECP phase. Afterwards, ecp_peripheral2host( ) will be invoked to actually transfer data from the peripheral to the host under ECP mode. Once the transfer is complete, the routine ends.

Through the above-described routines, a 1284 compliant driver supporting compatibility, nibble and ECP modes is created. The invention has been described with reference to a specific embodiment thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method of providing parallel communications between a host and a peripheral comprising the steps of:
    opening a device driver in the host;
    negotiating the host and the peripheral into a best mode supported by both the host and the peripheral;
    satisfying streams requirements;
    placing a data to be transferred from the host to the peripheral in a first queue; and
    transferring the data from the first queue to the peripheral through a parallel port.

2. The method of claim 1 wherein the step of transferring comprises the steps of:
    acquiring a device mutex;
    negotiating into a correct mode and a correct phase; and
    initiating a forward transfer.

3. The method of claim 1 further comprising the steps of:
    placing a control message on the first queue if a backchannel transfer is desired;
    reading the backchannel responsive to the service of the control message; and
    pushing a backchannel data onto a second queue.

4. The method of claim 1 wherein the step of negotiating comprises the steps of:
    attempting to negotiate into ECP mode;
    attempting to negotiate into nibble mode if the host and peripheral cannot support ECP mode;
    defaulting to compatibility mode if unable to negotiate into nibble mode.

5. The method of claim 4 wherein both ECP and nibble modes have a PIO driven backchannel.

6. The method of claim 3 wherein each entry in the first queue is one of an M_DATA type and an M_CTL type.

7. The method of claim 6 wherein each M_DATA entry corresponds to a forward transfer and each M_CTL corresponds to a backchannel request.

8. A method of driving a parallel port comprising the steps of:
    negotiating the port into a best mode;
    retrieving a message block from a write queue;
    setting a phase of the mode to accommodate a desired transfer;
    initiating a forward transfer of a predetermined first type of message block; and
    initiating a backchannel transfer responsive to a predetermined second type of message block.

9. The method of claim 8 wherein the forward transfer is conducted using direct memory access.

10. The method of claim 8 wherein the backchannel transfer is conducted using a PIO interface.

11. The method of claim 8 wherein the write queue is always serviced in a FIFO manner.

12. A system providing a parallel port multiple mode device driver comprising:
    a host kernel supporting a streams environment;
    the device driver residing within the host kernel and interfacing with the streams environment;
    the driver for driving hardware of the parallel port in multiple modes to conduct forward and reverse transfers; and
    a parallel port connecting the host kernel to a peripheral.

13. The system of claim 12 wherein the multiple mode parallel port is 1284 compliant.

14. The system of claim 13 wherein the device driver supports only ECP mode, nibble mode and COMPAT mode.

15. A parallel port multiple mode device driver comprising:
    a streams interface;
    a negotiation routine interacting with the streams interface and setting a host and a peripheral to a best mode supported by the host and the peripheral;
    an arbiter which controls access to a parallel port responsive to the negotiation routine and a content of a first queue;
    a forward transfer initiator responsive to the arbiter; and
    a reverse transfer initiator responsive to the arbiter.

16. A computer-readable medium having stored thereon instructions which, when executed by a processor, cause the processor to perform steps for conducting transfers between a host and a peripheral on a parallel port, said steps comprising:

negotiating into a best mode supported by the host and the peripheral;

satisfying streams requirement in the host;

queuing a message corresponding to data to be transferred; and initiating a transfer of data corresponding to the data.

17. The computer-readable medium of claim 16 wherein the steps further comprise:

reading a backchannel if a message of a particular type is on the queue; and delivering data read from the backchannel to an intended recipient.

18. The computer-readable medium of claim 16 wherein the step of queuing queues a data packet if a transfer to be initiated is a forward transfer and queues a backchannel request packet if the transfer to be initiated is a reverse transfer.

19. The computer-readable medium of 16 wherein the step of negotiating places the peripheral and host in one of ECP mode, nibble mode, and COMPAT mode.

20. The computer-readable medium of claim 16 wherein the step of satisfying streams requirements permits handshaking with an upper level module and usage of an ioctl.

* * * * *